United States Patent
Nagao et al.

(10) Patent No.: US 11,676,397 B2
(45) Date of Patent: Jun. 13, 2023

(54) SYSTEM AND METHOD FOR DETECTING AN OBJECT COLLISION

(71) Applicant: Denso International America, Inc., Southfield, MI (US)

(72) Inventors: Satoshi Nagao, Bellevue, WA (US); Yohsuke Satoh, Bellevue, WA (US); Takuma Sudo, Plano, TX (US)

(73) Assignee: DENSO International America, Inc., Southfield, MI (US)

( * ) Notice: Subject to any disclaimer, the term of this patent is extended or adjusted under 35 U.S.C. 154(b) by 279 days.

(21) Appl. No.: 17/197,514

(22) Filed: Mar. 10, 2021

(65) Prior Publication Data

US 2022/0121859 A1 Apr. 21, 2022

Related U.S. Application Data

(60) Provisional application No. 63/091,982, filed on Oct. 15, 2020.

(51) Int. Cl.
*G06V 10/75* (2022.01)
*G06V 20/56* (2022.01)
(Continued)

(52) U.S. Cl.
CPC .............. *G06V 20/56* (2022.01); *G06T 7/001* (2013.01); *G06V 10/751* (2022.01); *G07C 5/008* (2013.01);
(Continued)

(58) Field of Classification Search
CPC ...... G06V 20/56; G06V 20/58; G06V 20/625; G06V 10/751; G06T 7/001;
(Continued)

(56) References Cited

U.S. PATENT DOCUMENTS

| | | | |
|---|---|---|---|
| 10,523,904 B2 | 12/2019 | Mahmoud et al. | |
| 2010/0177963 A1* | 7/2010 | Yokomitsu | G06T 7/20 382/170 |
| 2020/0226734 A1 | 7/2020 | Kumar et al. | |

FOREIGN PATENT DOCUMENTS

| JP | H11144196 A | * | 5/1999 |
|---|---|---|---|
| JP | 5106225 B2 | | 10/2012 |

(Continued)

OTHER PUBLICATIONS

Translation of JP H11-144196 (Year: 1999).*
(Continued)

*Primary Examiner* — Carol Wang
(74) *Attorney, Agent, or Firm* — Christopher G. Darrow; Darrow Mustafa PC (57) ABSTRACT

A system for detecting an object collision includes a processor and a memory in communication with the processor with an objection collision detection module. The objection collision detection module has instructions that, when executed by the processor, cause the processor to obtain a first image and a second image of a scene from a camera sensor mounted to a vehicle, determine a change amount between the first image and the second image, and based on the change amount, determine at least one of that an object is approaching the vehicle or the object has collided with the
(Continued)

vehicle. The change amount represents the number of pixels with the same location value that changed intensity values between the first and second images.

20 Claims, 5 Drawing Sheets

(51) Int. Cl.
  *G06T 7/00* (2017.01)
  *G07C 5/00* (2006.01)
  *H04N 25/40* (2023.01)
  *G06V 20/62* (2022.01)
(52) U.S. Cl.
  CPC ... *H04N 25/40* (2023.01); *G06T 2207/30252* (2013.01); *G06V 20/625* (2022.01)
(58) Field of Classification Search
  CPC .......... G06T 2207/30252; H04N 25/40; G07C 5/0866; G07C 5/008
  See application file for complete search history.

(56) References Cited

FOREIGN PATENT DOCUMENTS

JP      2015032082 A  *  2/2015
KR    20110114091 A      10/2011

OTHER PUBLICATIONS

Translation of JP 2015-032082 (Year: 2015).*
Ibrahim, Hamdy A., Ahmed K. Aly, and Behrouz H. Far. "A system for vehicle collision and rollover detection." In 2016 IEEE Canadian Conference on Electrical and Computer Engineering (CCECE), pp. 1-6. IEEE, 2016. (Year: 2016).*
Chen, C. T., and Y. S. Chen. "Real-time approaching vehicle detection in blind-spot area." In 2009 12th international IEEE conference on intelligent transportation systems, pp. 1-6. IEEE, 2009. (Year: 2009).*
Pajares, Gonzalo. "A Hopfield neural network for image change detection." IEEE Transactions on Neural Networks 17, No. 5 (2006): 1250-1264. (Year: 2006).*

* cited by examiner

SYSTEM AND METHOD FOR DETECTING AN OBJECT COLLISION

CROSS-REFERENCE TO RELATED APPLICATION

This application claims the benefit of U.S. Provisional Patent Application No. 63/091,982, entitled "DAMAGE DETECTION ALGORITHM," filed Oct. 15, 2020, which is incorporated by reference herein in its entirety.

TECHNICAL FIELD

The subject matter described herein relates, in general, to systems and methods for determining when an object collision has occurred and, more specifically, to systems and methods for determining when an object collision occurs involving a parked vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

There have been situations where when a vehicle is parked, an object collides with the vehicle causing damage to the vehicle. In some cases, the vehicle may be parked in a parking lot, and the object, which may be another vehicle, is operated in such a way that it collides with the vehicle, causing damage to the vehicle. Generally, when this occurs, the operator of the offending vehicle may leave information on the damaged vehicle so that the owner of the damaged vehicle may contact the operator to pay for any damage that may have occurred.

Nevertheless, there have been numerous cases where the operator of the offending vehicle does not leave information on the damaged vehicle. In some cases, this occurs in situations where the operator of the offending vehicle does not realize that they collided with another vehicle. However, in other cases, the operator of the offending vehicle may wish to avoid assuming responsibility for the damage that they may have caused.

SUMMARY

This section generally summarizes the disclosure and is not a comprehensive explanation of its full scope or all its features.

In one example, a system for detecting an object collision includes a processor and a memory having an object collision detection module that is in communication with the processor. The object collision detection module has instructions that, when executed by the processor, cause the processor to obtain a first image and a second image of a scene from a camera sensor mounted to a vehicle, determine a change amount between the first image and the second image, and based on the change amount, determine at least one of that an object is approaching the vehicle or the object has collided with the vehicle. The change amount represents the number of pixels with the same location value that changed intensity values between the first and second images.

In another example, a method for detecting an object collision includes the steps of obtaining a first image and a second image of a scene from a camera sensor mounted to a vehicle, determining a change amount between the first image and the second image, and based on the change amount, determining at least one of: an object is approaching the vehicle or the object has collided with the vehicle. Like before, the change amount represents the number of pixels with the same location value that changed intensity values between the first and second images.

In yet another example, a non-transitory computer-readable medium having instructions that, when executed by a processor, cause the processor to obtain a first image and a second image of a scene from a camera sensor mounted to a vehicle, determine a change amount between the first image and the second image, and based on the change amount, determine at least one of: an object is approaching the vehicle or the object has collided with the vehicle. Again, the change amount represents the number of pixels with the same location value that changed intensity values between the first and second images.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are a system and related method for determining an object collision. In one example, the system for determining an object collision may be utilized by a first vehicle to determine when another object, such as a second vehicle, collides with the first vehicle. The first vehicle may include one or more cameras that can capture images from one or more fields of {01238760} 3 view external to the first vehicle. The images captured by the camera may be made up of a plurality of pixels. Each of the pixels includes a pixel location and intensity value.

The system for determining an object collision receives these images and determines a change amount that generally indicates the number of pixels having the same location that changed intensities between sequential images. Moreover, depending on the change amount, the system may determine that no object is approaching the first vehicle, an object is approaching the first vehicle, and/or an object has collided with the first vehicle.

Generally, if the change amount is below an approaching threshold, the system may determine that no object is approaching the first vehicle. If the change amount is greater than the approaching threshold but less than a collision threshold, the system may determine that an object is approaching the first vehicle. If the change amount is greater than the collision threshold, the system and method may determine that an object has collided with the vehicle.

Upon detecting a collision, the system may obtain identifying information that may identify the object that has collided with the first vehicle and provide this information to a remote device, which may be accessible by the owner of the first vehicle. This allows the owner of the first vehicle to know when their vehicle has been involved in a collision and/or include the identity of the object and/or the operator of the object that struck the first vehicle.

Figure 1:
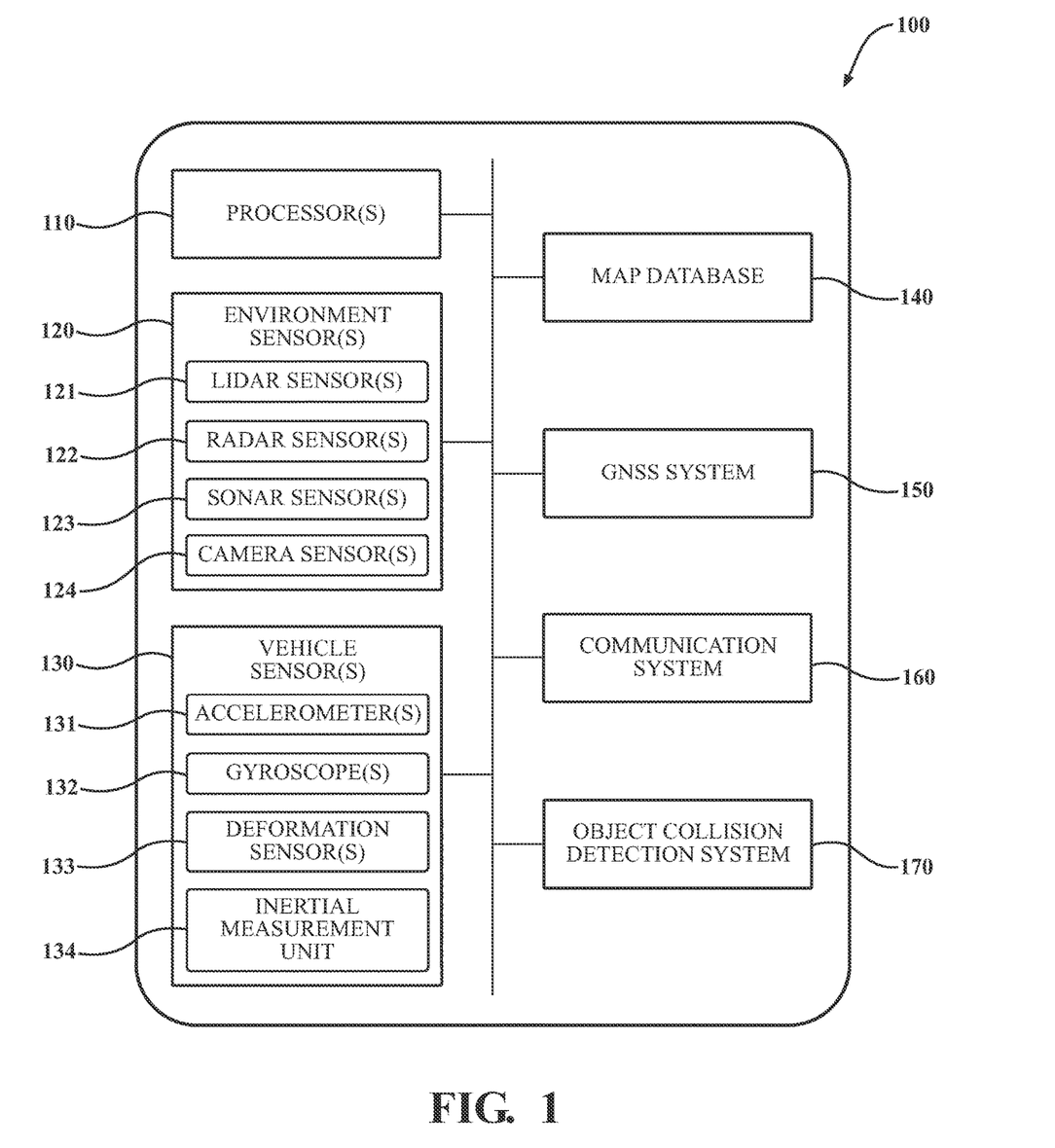
FIG. 1 illustrates a vehicle that incorporates a system for detecting an object collision.

FIG. 1 illustrates an example of a vehicle 100 that may incorporate an object collision detection system 170. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems and thus benefits from the functionality discussed herein. However, the vehicle 100 could be semi-autonomous or non-autonomous.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include environment sensor(s) 120 and/or vehicle sensor(s) 130. The environment sensor(s) 120 and/or the vehicle sensor(s) 130 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the environment sensor(s) 120 and/or the vehicle sensor(s) 130 includes a plurality of sensors, the sensors can work independently. Alternatively, two or more of the sensors can work in combination with each other. In such a case, the two or more sensors can form a sensor network. The environment sensor(s) 120 and/or the vehicle sensor(s) 130 can be operatively connected to the processor(s) 110 and/or another element of the vehicle 100, including any of the elements shown in FIG. 1.

Generally, the environment sensor(s) 120 collect information regarding the environment in which the vehicle 100 operates. The environment sensor(s) 120 can include one or more environment sensors configured to acquire, and/or sense environment data. "Environment data" includes data or information about the external environment in which a vehicle is located or one or more portions thereof. For example, the o environment sensor(s) 120 can be configured to detect, quantify, and/or sense obstacles in at least a portion of the external environment of the vehicle 100 and/or information/data about such obstacles. Such obstacles may be stationary objects and/or dynamic objects.

Various examples of sensors of the environment sensor(s) 120 will be described herein. However, it will be understood that the embodiments are not limited to the particular sensors described. As an example, in one or more arrangements, the environment sensor(s) 120 can include one or more LIDAR sensor(s) 121, one or more radar sensor(s) 122, one or more sonar sensor(s) 123, and/or one or more camera sensor(s) 124. In one or more arrangements, the one or more cameras sensor(s) 124 can be high dynamic range (HDR) cameras or infrared (IR) cameras.

The vehicle sensor(s) 130, the vehicle sensor(s) 130 can include sensors that measure one or more characteristics or forces acting upon the vehicle 100. In one example, the vehicle sensor(s) 130 may include one or more accelerometer(s) 131, one or more gyroscope(s) 132, one or more deformation sensor(s) 133, and/or an inertial measurement unit 134.

The vehicle 100 may also include a communication system 160 that can communicate with systems external to the vehicle 100. For example, the communication system 160 may utilize one or more wireless communication methodologies that allow any of the components shown in FIG. 1 to communicate with an external system. In one example, the communication system 160 may include cellular communication hardware that allows any of the systems incorporated within the vehicle 100 to communicate with an external server. Further still, the communication system 160 may be able to send and/or receive information from an external device, such as a mobile device or other device that may be in possession of the owner and/or operator of the vehicle 100, to allow the owner and/or operator of the vehicle 100 to receive information regarding the vehicle 100.

The vehicle 100 may also include a map database 140 and a global navigation satellite system (GNSS) 150. The GNSS 150 can receive one or more signals from satellites. These one or more signals can be interpreted by the GNSS 150 to determine the location of the vehicle 100. In one example, the GNSS 150 may be a Global Positioning System, but may be other types of GNSS systems such as Global Navigation Satellite System (GLONASS), BeiDou Navigation Satellite System (BDS), and Galileo.

The map database 140 may include one or more electronic maps of the environment. The map database 140 may include information regarding the location of roads, road markers (stop signs, traffic lights, traffic signs, and the like), and specific information about roads. For example, with regards to roads, the map database 140 may include information regarding if the road is a traditional road that allows non-motorized vehicles and pedestrians to utilize portions of the roads or a highway, such as a controlled-access highway, which may be prohibited for use by pedestrians and non-motorized vehicles. Other types of information may include the location of crosswalks that may cross one or more roads within the map database 140. The map database 140 may include information regarding the location and borders of different municipalities, such as cities and townships, and other information regarding the borders of different entities, such as parks, farms, playgrounds, schools, military bases, hospitals, and the like.

Figure 2:
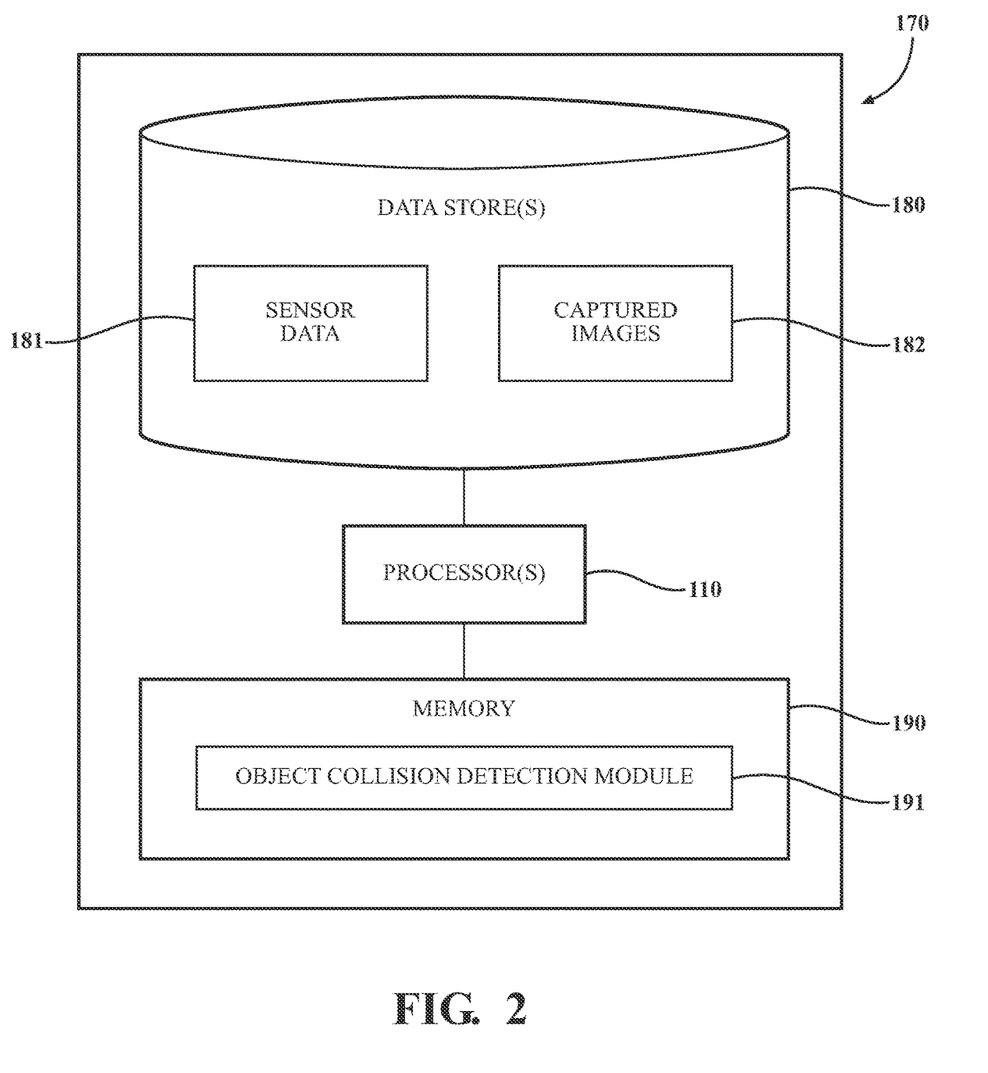
FIG. 2 illustrates a more detailed view of the system for detecting an object collision of FIG. 1.

FIG. 2 illustrates a more detailed view of the object collision detection system 170. As shown, the object collision detection system 170 may include one or more processor(s) 110. Accordingly, the processor(s) 110 may be a part of the object collision detection system 170, or the object collision detection system 170 may access the processor(s) 110 through a data bus or another communication path. In one or more embodiments, the processor(s) 110 is an application-specific integrated circuit that is configured to implement functions associated with an object collision detection module 191.

In general, the processor(s) 110 is an electronic processor such as a microprocessor capable of performing various functions as described herein. In one embodiment, the object collision detection system 170 includes a memory 190 that stores the object collision detection module 191. The memory 190 is a random-access memory (RAM), read-only memory (ROM), a hard disk drive, a flash memory, or other suitable memory for storing the object collision detection module 191. The object collision detection module 191 is, for example, computer-readable instructions that, when executed by the processor(s) 110, cause the processor(s) 110 to perform the various functions disclosed herein.

Furthermore, in one embodiment, the object collision detection system 170 includes one or more data store(s) 180. The data store(s) 180 is, in one embodiment, an electronic data structure such as a database that is stored in the memory 190 or another memory and that is configured with routines that can be executed by the processor(s) 110 for analyzing stored data, providing stored data, organizing stored data, generating data, and so on. Thus, in one embodiment, the data store(s) 180 stores data used or generated by the object collision detection module 191.

In this example, the data store(s) 180 may include sensor data 181 that may include information that originated from the environment sensor(s) 120 and/or the vehicle sensor(s) 130. This information may also include captured images 182 that may include images captured by the camera sensor(s) 124. As will be explained later in this specification, by analyzing the images 182 from the camera sensor(s) 124, the object collision detection system 170 can determine if an object is approaching the vehicle 100 and/or has collided with the vehicle 100.

The object collision detection module 191 may include instructions that, when executed by the processor(s) 110, cause the processor(s) 110 to obtain a first image and a second image of a scene from the camera sensor(s) 124 mounted to the vehicle 100. The first image and the second image may be sequential images of the scene having a set number of pixels. Each of the pixels of the first image and the second image may have an intensity value and a location value.

Figure 3A:
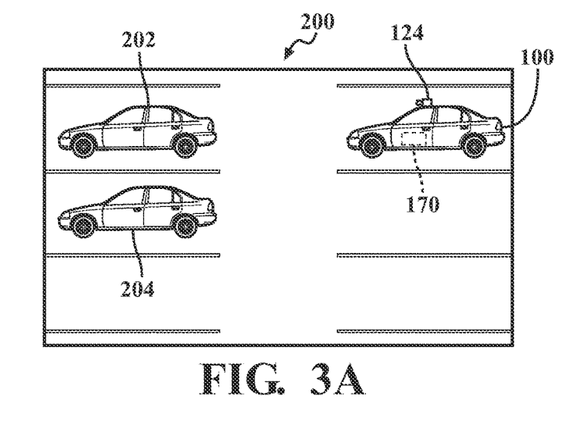
FIGS. 3A and 3B illustrate an example scene and an image captured by a camera, respectively, wherein the system for detecting an object collision has determined that no collision has occurred and that no objects are approaching a vehicle.
Figure 3B:
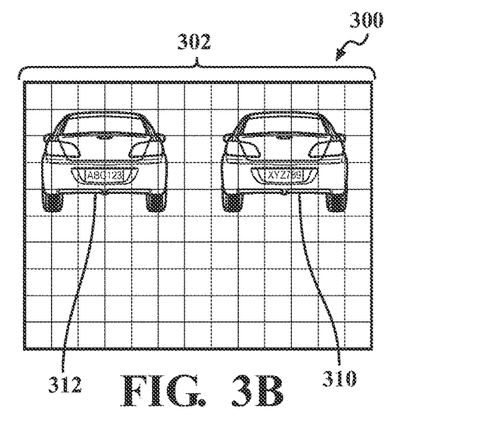

For example, referring to FIGS. 3A and 3B, illustrated is a scene 200 involving the vehicle 100 with the camera sensor(s) 124 and the object collision detection system 170 in FIG. 3A, while FIG. 3B illustrates an image 300 captured by the camera sensor(s) 124. Here, the image 300 is captured by the camera sensor(s) 124 of the scene 200. Here, the image 300 illustrates vehicles 202 and 204. The image 300 displays the vehicles 202 and 204 as vehicle images 310 and 312, respectively.

In this example, the vehicle 100 is parked. However, it should be understood that the vehicle 100 may also be moving. In one example, the object collision detection module 191 may cause the processor(s) 110 to determine if the vehicle 100 is parked.

The image 300 is made up of a plurality of pixels 302. The image 300 is illustrated to have 11 columns and 9 rows of pixels, yielding 99 pixels. However, generally, the image 300 may be made up of thousands or even millions of pixels. The example provided in the image 300 only includes 99 pixels for ease of explanation. As such, it should be understood image 300 can include any one of a number of pixels.

Generally, each of the pixels 302 is defined by both a pixel location and one or more intensity values. The pixel location for each of the pixels 302 indicates the pixel's location within the image 300. The intensity values associated with each pixel 302 may include intensities detected by the camera sensor(s) 124. If the image 300 were a black-and-white image, the pixels 302 making up the image 300 would only have one intensity value having two and intensity levels—black or white. If the image 300 were a grayscale image, the pixels 302 making up the image 300 would have one intensity value with many more intensity levels. If the image 300 is a color image, the pixels 302 making up the image 300 may have multiple intensity values representing different colors, such as red/green/blue, each having numerous intensity values. Nevertheless, the pixels 302 that make up the image 300 will include both location information and at least one intensity value associated with that pixel.

The object collision detection module 191 also includes instructions that, when executed by the processor(s) 110, cause the processor(s) 110 to determine a change amount between a first image and a second image. The change amount indicates a number of pixels with the same location value that changed intensity values between the first and second images.

Figure 4A:
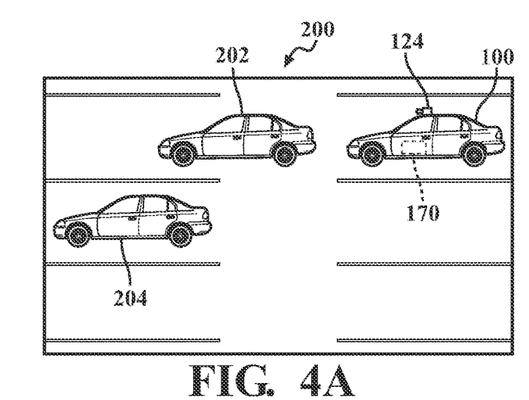
FIGS. 4A and 4B illustrate an example scene and an image captured by a camera, respectively, wherein the system for detecting an object collision has determined that an object is approaching a vehicle but has not collided with the vehicle.
Figure 4B:
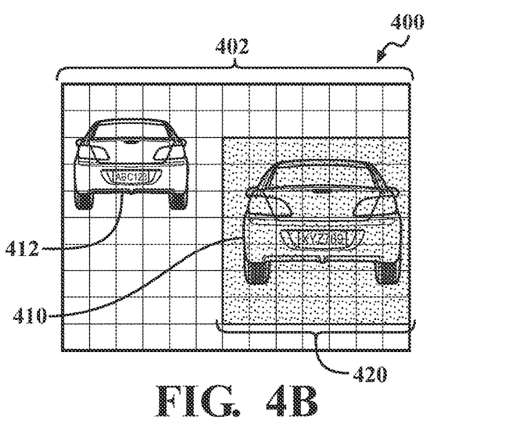

Referring to the example shown in FIGS. 4A and 4B, FIG. 4A illustrates the scene 200 that is similar to the scene 200 of FIG. 3A but has changed because the vehicle 202 is now approaching the vehicle 100, while the vehicle 204 has remained stationary. FIG. 4B illustrates an example of an image 400 captured that represents the scene 200 of FIG. 4A. In this example, the image 400, like the image 300, is made up of a plurality of pixels 402 that includes pixels that form the vehicle images 410 and 412 of the vehicles 202 and 204, respectively, in the scene 200 shown in FIG. 4A. The pixels 402 making up the image 400 each have location and intensity values. The location of a particular pixel in the image 400 corresponds to the pixel at the same location in the image 300.

When comparing the pixels 302 of the image 300 to the pixels 402 of the image 400, the intensity values of some of the pixels of the image 400 have changed with respect to the image 300. The movement of vehicle 202 causes a change in the intensity values as it approaches the vehicle 100. As such, because the vehicle 202 moved, the vehicle image 412 moved compared to the vehicle image 312 that represents the vehicle 202 of the scene 200.

As such, pixels 420 of the pixels forming the image 400 has changed intensity values. In this example, the pixels 420 include 6 columns and 7 rows of pixels for a total of 42 pixels that have had a change in intensity value between the image 300 and the image 400. As such, the change amount could represent a number of the pixels that changed intensity values between the image 300 and the image 400 and/or a percent of the pixels that changed intensity values between the image 300 and the image 400.

Briefly, it should also be noted that to count pixels that have experienced a change in intensity values, intensity values may be subject to a threshold amount. The threshold amount may be represented by any value, such as a threshold percentage. Moreover, it is not uncommon that pixels with each subsequent image captured by a camera sensor may record small variations in their intensity values even though the scene is unchanged. In one example, filtering may be performed, using an intensity threshold, to determine which pixels have experienced changes in their intensity values, indicating the movement of one or more objects within the scene. For example, if the intensity value change is less than 10% or some other intensity threshold value, the pixels below this intensity threshold may not be counted in the change amount, as the change in these pixels' intensity values may be attributed to noise.

The object collision detection module 191 also includes instructions that, when executed by the processor(s) 110, cause the processor(s) 110 to determine, based on the change amount, if an object is approaching the vehicle 100 and/or if the object has collided with the vehicle 100. Moreover, in this example, the pixels 420 subject to changes in intensity value can be utilized to determine if the vehicle 202 has collided with the vehicle 100. In this example, when comparing the image 400 to the image 300 to generate the change amount, 42 of the 99 pixels 420 of the image 400 have changed intensity values compared to the image 300. As such, the object collision detection module 191 may cause the processor(s) 110 to compare the change amount to both an approaching threshold and a collision threshold. The approaching threshold is generally less than the collision threshold.

For example, the approaching threshold may require that a least 10% of the pixels forming the image change intensity values. The collision threshold may require at least 90% of the pixels forming the image change their intensity values. It should be understood that the example percentages provided for the collision threshold and/or the approaching threshold are only examples and may be dynamic and change or may be fixed to a different percent. In the example shown in FIGS. 4A and 4B, 42 of the 99 pixels have changed intensities and are counted in the change amount or approximately 42%. In this example, because the change amount of 42% is greater than the approaching threshold but less than the collision threshold, the object collision detection module 191 may cause the processor(s) 110 to determine that an object is approaching the vehicle 100 but has not collided with the vehicle 100.

In addition to utilizing the intensity values to determine the change amount as described above, the location of the pixels that form the change amount may also be utilized. For example, if pixels with changed intensity values are spread throughout the image, these pixels may be discounted from the change amount. Conversely, if the pixels that changed intensity values are generally near each other and form a contiguous shape, such as the rectangle formed by the pixels 420 of FIG. 4B, these pixels would be counted in the change amount. If a single pixel located away from the pixels 420 saw a change in intensity value, this pixel may be discounted from the change amount.

Figure 5A:
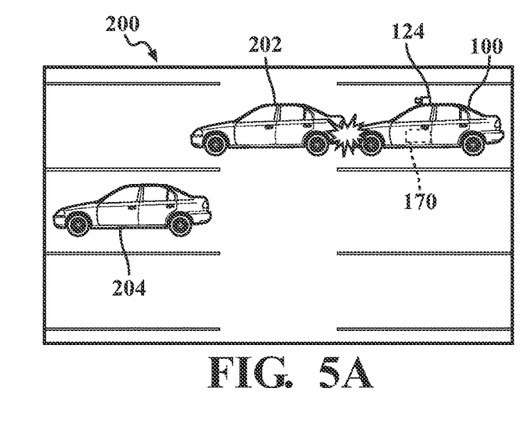
FIGS. 5A and 5B illustrate an example scene and an image captured by a camera, respectively, wherein the system for detecting an object collision has determined that an object has collided with the vehicle.
Figure 5B:
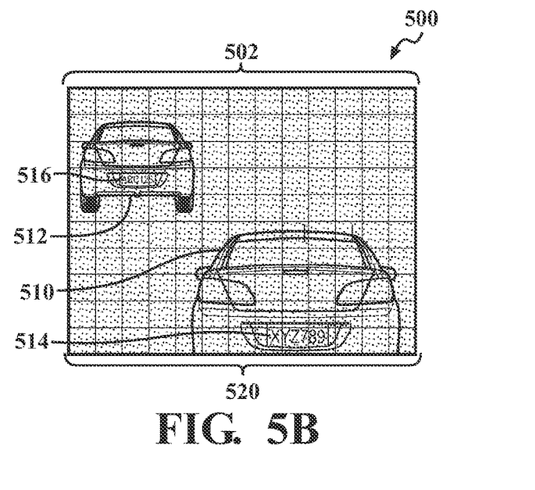

Referring to FIGS. 5A and 5B, illustrated is the scene 200 and an image 500 captured by the camera sensor(s) 124 of the vehicle 100, where the vehicle 202, represented by the vehicle image 510, has collided with the vehicle 100. Like before, vehicle 204 remains stationary, as indicated by the vehicle image 512. In this example, the object collision detection module 191 may cause the processor(s) 110 to determine a change amount regarding the change in intensity values between the pixels 502 of the image 500 with the intensity values of the pixels 402 of the image 400.

Here, as is generally well known, when an object, such as the vehicle 202, collides with the vehicle 100, the vehicle 100 will suddenly shake. This sudden shaking of the vehicle 100 when capturing an image, changes the alignment of the camera sensor(s) 124. This change in the alignment of the camera sensor(s) 124 ultimately results in a change in the intensity values of the pixels 502 that form the image 500. A large number of pixels 520 are subject to a change in intensity value when the vehicle 202 collides with the vehicle 100. As such, the pixels 520, which, in this example, represent all the pixels forming the image 500, have experienced a change in intensity values.

The object collision detection module 191 may cause the processor(s) 110 to determine the change amount representing the number and/or percent of pixels that changed between the images 500 and 400. As stated before, the sudden shaking of the vehicle 100 causing the change in the alignment of the camera 124 has caused nearly all the pixels 502 of the image 500 to have a change in intensity value. As such, these pixels are included in the change amount. In this example, the object collision detection module 191 may cause the processor(s) 110 to determine the change amount and compare it to a collision threshold.

As explained previously, the collision threshold may be a number or percent of pixels that have changed intensity values between two images and is generally greater than the approaching threshold. In one example, the collision threshold may be set to 90% of the total number of pixels that form the image 500. In this example, because nearly all the pixels 502 that form the image 500 have changed intensity values and have exceeded the collision threshold of 90%, the object collision detection module 191 may cause the processor(s) 110 to determine that an object has collided with the vehicle 100.

In addition to considering the change amount, other information may also be utilized to verify if a collision has occurred. For example, information from the vehicle sensor(s) 130 may be utilized to determine if the vehicle 100 has experienced any shaking or deformation indicating a collision with another object.

In the event that an object has collided with the vehicle 100, the object collision detection module 191 may cause the processor(s) 110 to communicate with an external device to notify a user of the external device that an object has collided with the vehicle 100. In one example, the external device may be accessed by the operator/owner of the vehicle 100 to inform the operator/owner that the vehicle 100 has been involved in a collision.

Figure 6:
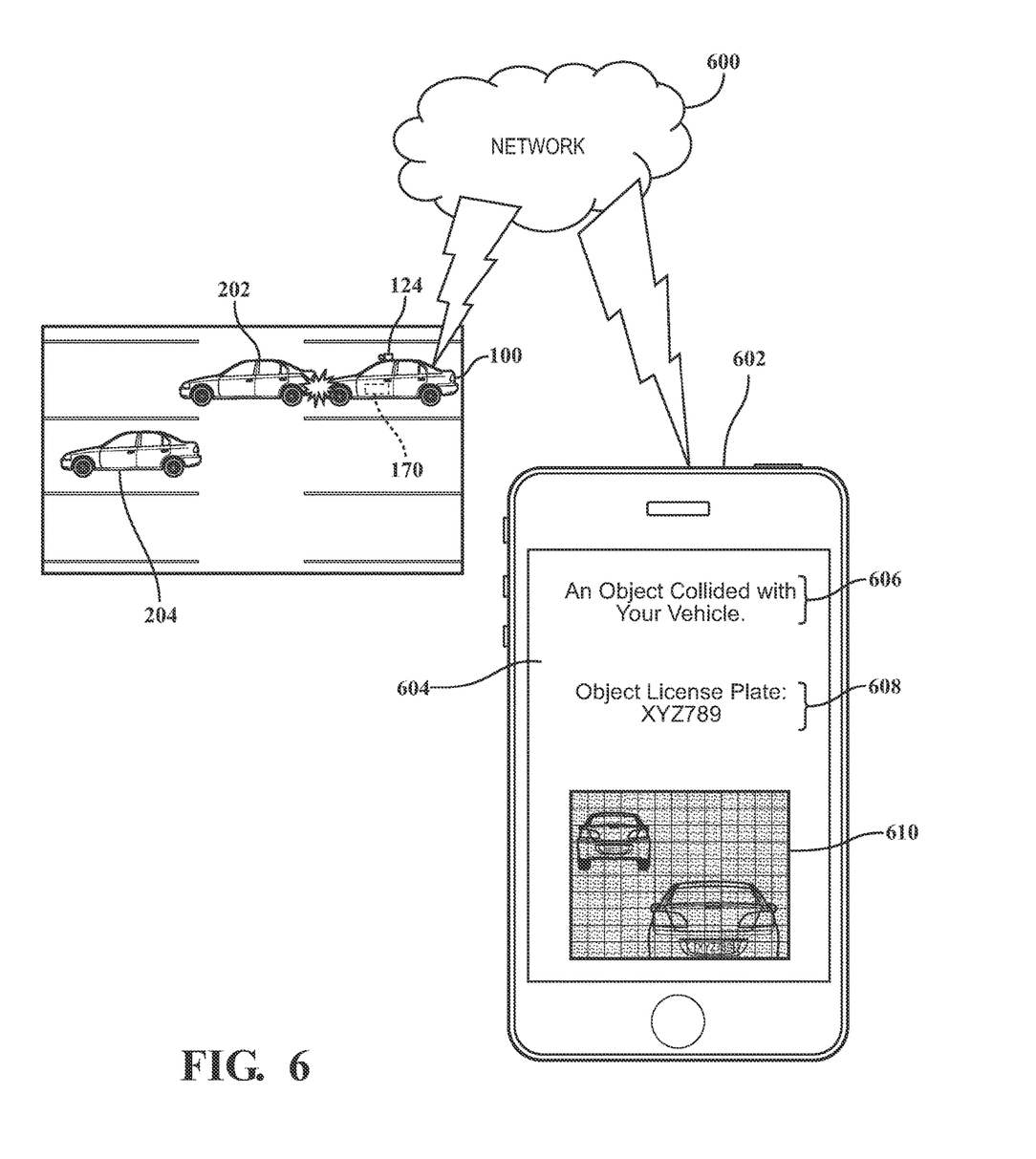
FIG. 6 illustrates an example of the system for detecting an object collision communicating with a remote device after determining that an object has collided with the vehicle.

For example, referring to FIG. 6, illustrated is a network 600 that can communicate with the vehicle 100 using the communication system 160 of the vehicle 100. Information from the vehicle 100 may be provided to an external device 602 via the network 600. In this example, the external device 602 is a mobile device having a display area 604. The information provided from the vehicle 100 could include event information 606, which indicates that an object has collided with the vehicle 100. The event information 606 could also include information when objects approach the vehicle 100.

Additionally, identifying information 608 may also be provided to the external device 602. For example, referring back to FIG. 5B, the vehicle images 510 and 512 that represent the vehicles 202 and 204, may also include identifying information in the form of license plate information. Here, the vehicle images 510 and 512 also include license plate images 514 and 516. The object collision detection module 191 may cause the processor(s) 110 to determine the identifying information of the vehicle 202. The identifying information of the vehicle 202 could include text related to the license plate images 514, as shown as identifying information 608 in FIG. 6.

Other information may also be provided to the external device 602. For example, an image 610 capturing the collision could be provided to the external device 602. In addition to the image of the collision, other images could also be shown, such as an image showing the vehicle 202 approaching the vehicle 100. The images could be still images or could be a collection of images that form a video. In addition to images, object type could also be sent to the external device, indicating the type of object that has collided with the vehicle 100 and/or location information of the vehicle 100 generated using the GNSS 150 and/or the map database 140.

Figure 7:
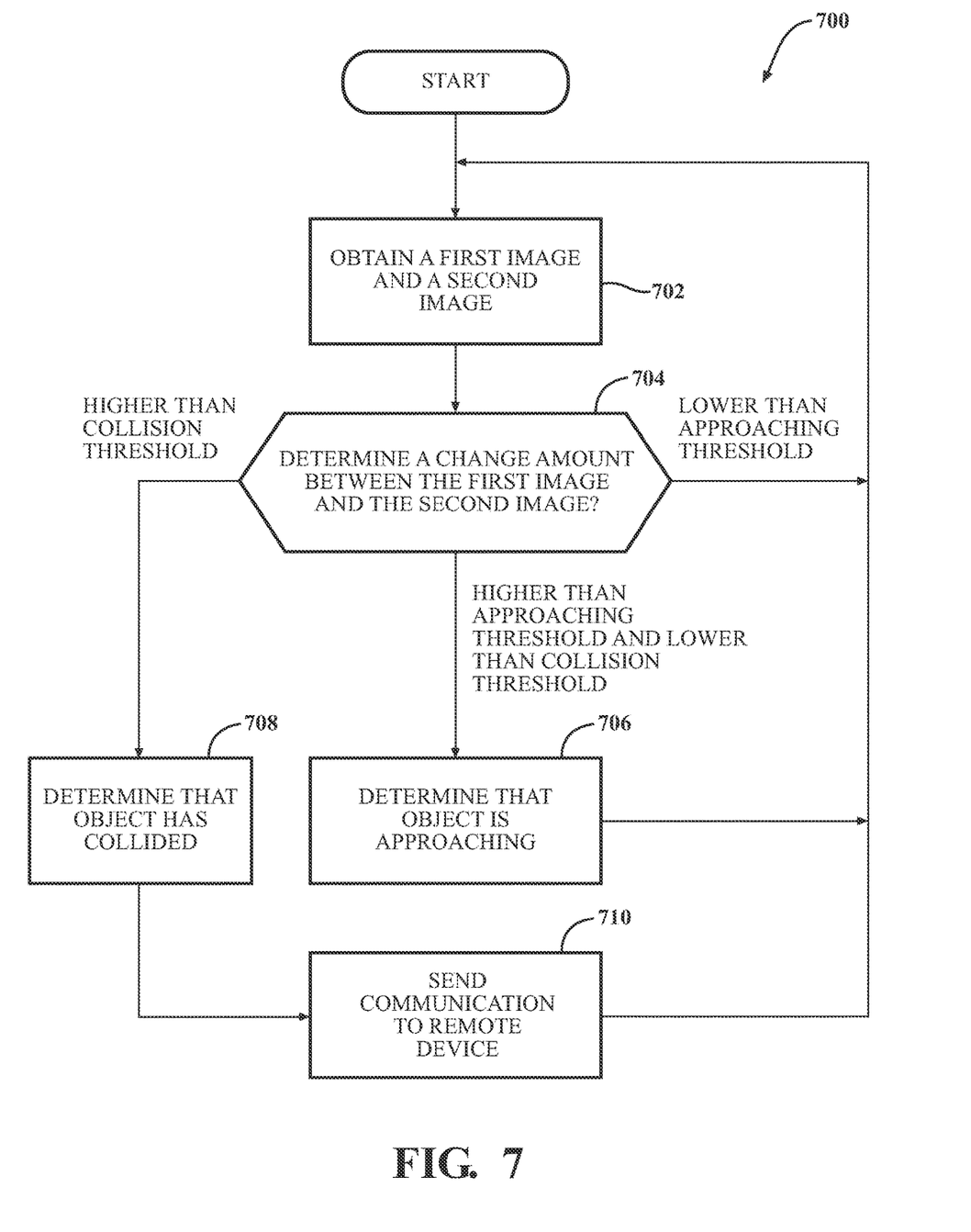
FIG. 7 illustrates a method for detecting an object collision.

Referring to FIG. 7, a method 700 for detecting an object collision. The method 700 will be described from the viewpoint of the vehicle 100 of FIG. 1 and the object collision detection system 170 of FIG. 2. However, it should be understood that this is just one example of implementing the method 700. While the method 700 is discussed in combination with the object collision detection system 170, it should be appreciated that the method 700 is not limited to being implemented within the object collision detection system 170 but is instead one example of a system that may implement the method 700.

In step 702, the object collision detection module 191 may include instructions that, when executed by the processor(s) 110, cause the processor(s) 110 to obtain a first image and a second image of a scene from the camera sensor(s) 124 mounted to the vehicle 100. The first image and the second image may be sequential images of the scene having a set number of pixels. Each of the pixels of the first image and the second image may have an intensity value and a location value.

In step 704, the object collision detection module 191 also includes instructions that, when executed by the processor(s) 110, cause the processor(s) 110 to determine a change amount between a first image and a second image. The change amount indicates a number of pixels with the same location value that changed intensity values between the first and second images. The object collision detection module 191 may cause the processor(s) 110 to compare the change amount to an approaching threshold and a collision threshold.

If the change amount is less than the approaching threshold, the method 700 returns to step 702. If the change amount is greater than the approaching threshold but less than the collision threshold, the method proceeds to step 706, wherein the object collision detection module 191 causes the processor(s) 110 to determine that an object is approaching the vehicle 100 but has not collided with the vehicle 100. If the change amount is greater than the collision threshold, the object collision detection module 191 may cause the processor(s) 110 to determine that an object has collided with the vehicle 100 is initiated in step 708.

Optionally, if it is determined that an object has collided with the vehicle 100, the object collision detection module 191 may cause the processor(s) 110 to communicate with an external device to notify a user of the external device that an object has collided with the vehicle 100, as shown in step 710. In one example, the external device may be accessed by the operator/owner of the vehicle 100 to inform the operator/owner that the vehicle 100 has been involved in a collision.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and can carry out these methods when loaded in a processing system.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for detecting an object collision comprising:
   a processor; and
   a memory in communication with the processor, the memory having an objection collision detection module, the objection collision detection module having instructions that, when executed by the processor, cause the processor to:
      obtain a first image and a second image of a scene from a camera sensor mounted to a vehicle, the first image and the second image being sequential images of the scene having a set number of pixels, each of the pixels of the first image and the second image having an intensity value and a location value,
      determine a change amount between the first image and the second image, the change amount indicating a number of pixels having a same location value that changed intensity values between the first image and the second image, and
      based on the change amount, determine at least one of: an object is approaching the vehicle and the object has collided with the vehicle.

2. The system of claim 1, wherein the objection collision detection module further comprises instructions that, when executed by the processor, cause the processor to determine that the object has collided with the vehicle when the change amount is greater than a collision threshold.

3. The system of claim 1, wherein the objection collision detection module further comprises instructions that, when executed by the processor, cause the processor to determine that the object is approaching the vehicle when the change amount is greater than an approaching threshold.

4. The system of claim 1, wherein the change amount indicates the number of pixels having the same location value that changed intensity values by an intensity threshold between the first image and the second image.

5. The system of claim 1, wherein the objection collision detection module further comprises instructions that, when executed by the processor, cause the processor to send an electronic communication to a remote device when the object has collided with the vehicle.

6. The system of claim 5, wherein the objection collision detection module further comprises instructions that, when executed by the processor, cause the processor to send at least one of the first image and the second image to the remote device when the object has collided with the vehicle.

7. The system of claim 5, wherein the objection collision detection module further comprises instructions that, when executed by the processor, cause the processor to:
   identify an object type of the object; and
   send the object type to the remote device when the object has collided with the vehicle.

8. The system of claim 1, wherein the objection collision detection module further comprises instructions that, when executed by the processor, cause the processor to:
   determine if the pixels having the same location value that changed intensity values between the first image and the second image form a contiguous shape, and
   based on the change amount and when the pixels having the same location value that changed intensity values between the first image and the second image form the contiguous shape, determine at least one of: the object is approaching the vehicle and the object has collided with the vehicle.

9. The system of claim 1, wherein the objection collision detection module further comprises instructions that, when executed by the processor, cause the processor to:
   determine identifying information of the object when the object has collided with the vehicle from at least one of the first image and the second image, the identifying information being a license plate attached to the object; and
   send the identifying information of the object to a remote device.

10. A method for detecting an object collision comprising the steps of:
    obtaining a first image and a second image of a scene from a camera sensor mounted to a vehicle, the first image and the second image being sequential images of the scene having a set number of pixels, each of the pixels of the first image and the second image having an intensity value and a location value;
    determining a change amount between the first image and the second image, the change amount indicating a number of pixels having a same location value that changed intensity values between the first image and the second image; and
    based on the change amount, determining at least one of: an object is approaching the vehicle and the object has collided with the vehicle.

11. The method of claim 10, further comprising the step of determining that the object has collided with the vehicle when the change amount is greater than a collision threshold.

12. The method of claim 10, further comprising the step of determining that the object is approaching the vehicle when the change amount is greater than an approaching threshold.

13. The method of claim 10, wherein the change amount indicates the number of pixels having the same location value that changed intensity values by an intensity threshold between the first image and the second image.

14. The method of claim 10, further comprising the step of sending an electronic communication to a remote device when the object has collided with the vehicle.

15. The method of claim 14, further comprising the step of sending at least one of the first image and the second image to the remote device when the object has collided with the vehicle.

16. The method of claim 14, further comprising the steps of:
    identifying an object type of the object; and
    sending the object type to the remote device when the object has collided with the vehicle.

17. The method of claim 10, further comprising the steps of:
    determining if the pixels having the same location value that changed intensity values between the first image and the second image form a contiguous shape; and
    based on the change amount and when the pixels having the same location value that changed intensity values between the first image and the second image form the contiguous shape, determining at least one of: the object is approaching the vehicle and the object has collided with the vehicle.

18. The method of claim 10, further comprising the steps of:
    determining identifying information of the object if the object has collided with the vehicle from at least one of the first image and the second image, the identifying information being in a license plate of the object; and
    sending the identifying information of the object to a remote device.

19. A non-transitory computer-readable medium having instructions that, when executed by a processor, cause the processor to:
    obtain a first image and a second image of a scene from a camera sensor mounted to a vehicle, the first image and the second image being sequential images of the scene having a set number of pixels, each of the pixels of the first image and the second image having an intensity value and a location value;
    determine a change amount between the first image and the second image, the change amount indicating a number of pixels having a same location value that changed intensity values between the first image and the second image; and
    based on the change amount, determine at least one of: an object is approaching the vehicle and the object has collided with the vehicle.

20. The non-transitory computer-readable medium of claim 19, further having instructions that, when executed by the processor, cause the processor to determine that the object has collided with the vehicle when the change amount is greater than a collision threshold.

* * * * *